May 20, 1941.  H. J. DE N. McCOLLUM  2,242,316
AUTOMOBILE HEATER
Filed Nov. 29, 1937  3 Sheets-Sheet 1

Inventor
Henry J. DeN McCollum
By Williams, Bradbury, McCaleb & Hinkle
Attys.

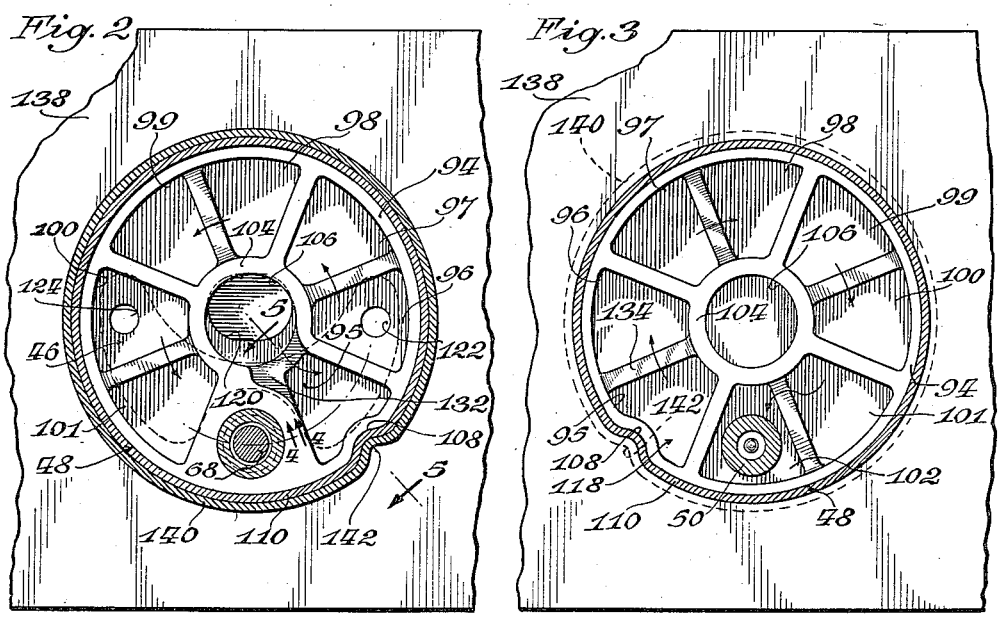
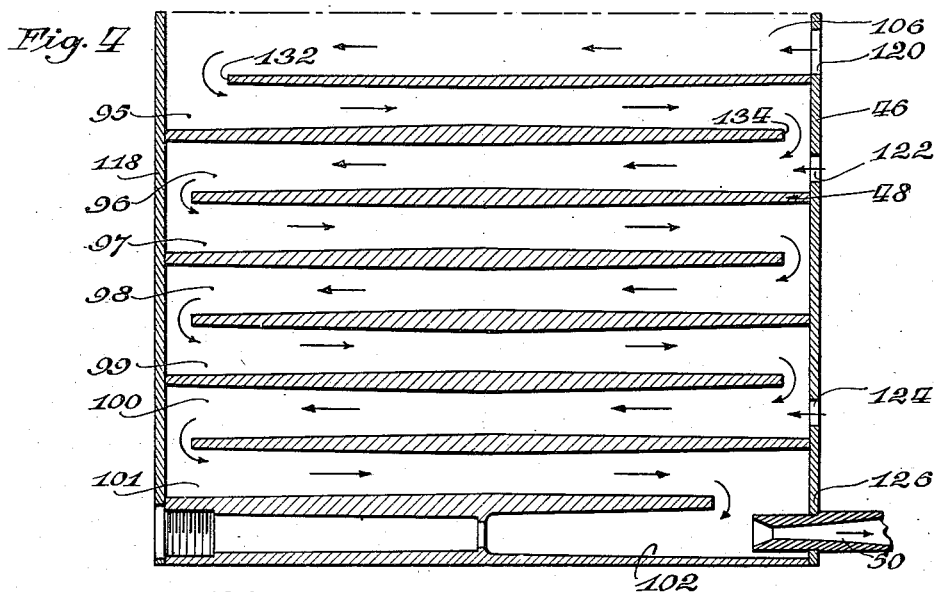
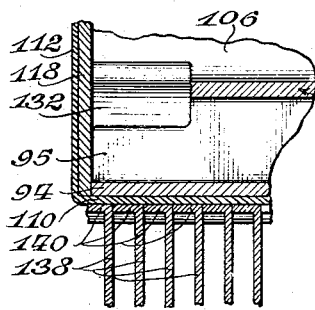

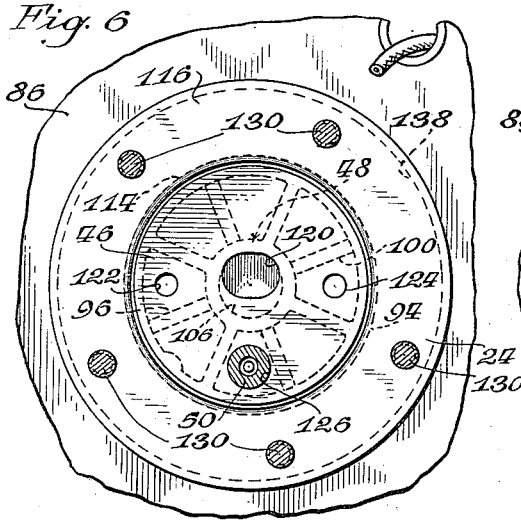
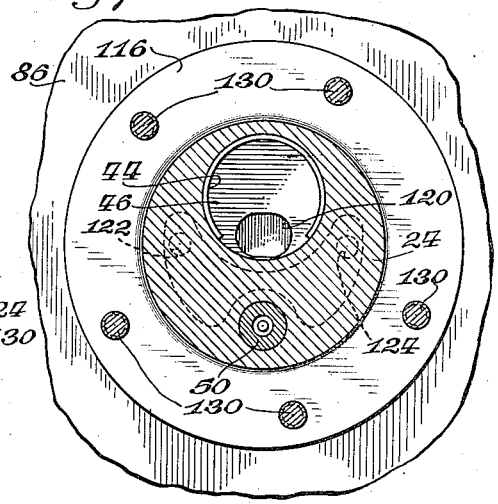
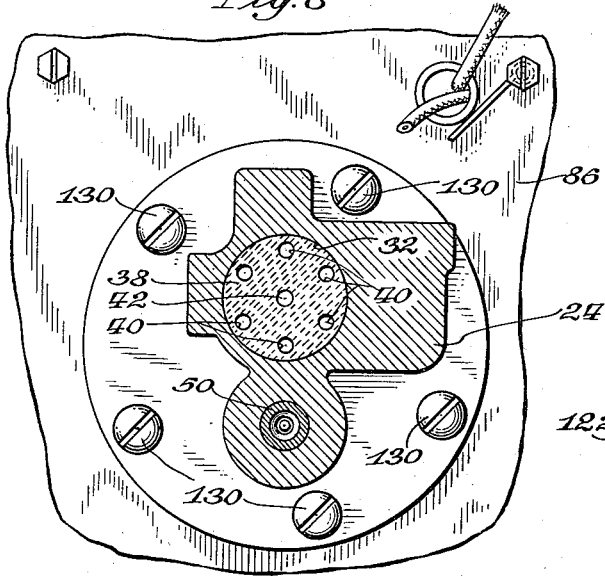
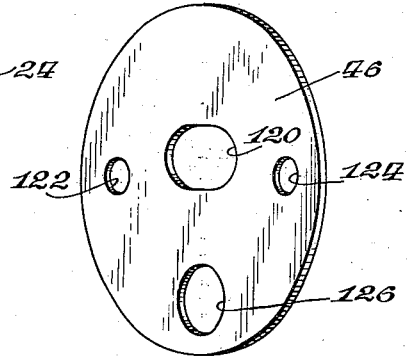

Patented May 20, 1941

2,242,316

UNITED STATES PATENT OFFICE 2,242,316

AUTOMOBILE HEATER

Henry J. De N. McCollum, Evanston, Ill.

Application November 29, 1937, Serial No. 177,076

8 Claims. (Cl. 257—124)

My invention relates generally to automobile heaters, and more particularly to automobile heaters of the internal combustion type. The improvement herein disclosed and claimed relates more specifically to the heat transfer means by which the heat of the gases of combustion is transferred to the air in the passenger compartment of the vehicle.

It is an object of my invention to provide an improved radiator capable of receiving the hot gases of combustion, subtracting a large proportion of the heat therefrom, and transmitting the heat to the air of the passenger compartment of the vehicle which is circulated past the radiator.

A further object is to provide an improved radiator for automobile heaters of the internal combustion type, which is substantially noiseless in operation.

A further object is to provide an improved radiator for automobile heaters of the internal combustion type in which means are provided to prevent variations in pressure throughout the passageway through the radiator, thereby to assure steady uninterrupted combustion.

A further object is to provide an improved radiator construction which may be easily and economically manufactured.

Other objects will appear from the following description, reference being had to the accompanying drawings, in which:

Fig. 1 is a central vertical sectional view of the heater;

Figs. 2 and 3 are transverse sectional views of the radiator taken on the lines 2—2 and 3—3, respectively, of Fig. 1;

Fig. 4 is a developed sectional view of the radiator body taken along the circular line 4—4 of Fig. 2;

Fig. 5 is a fragmentary sectional view taken on the line 5—5 of Fig. 2;

Figure 1:
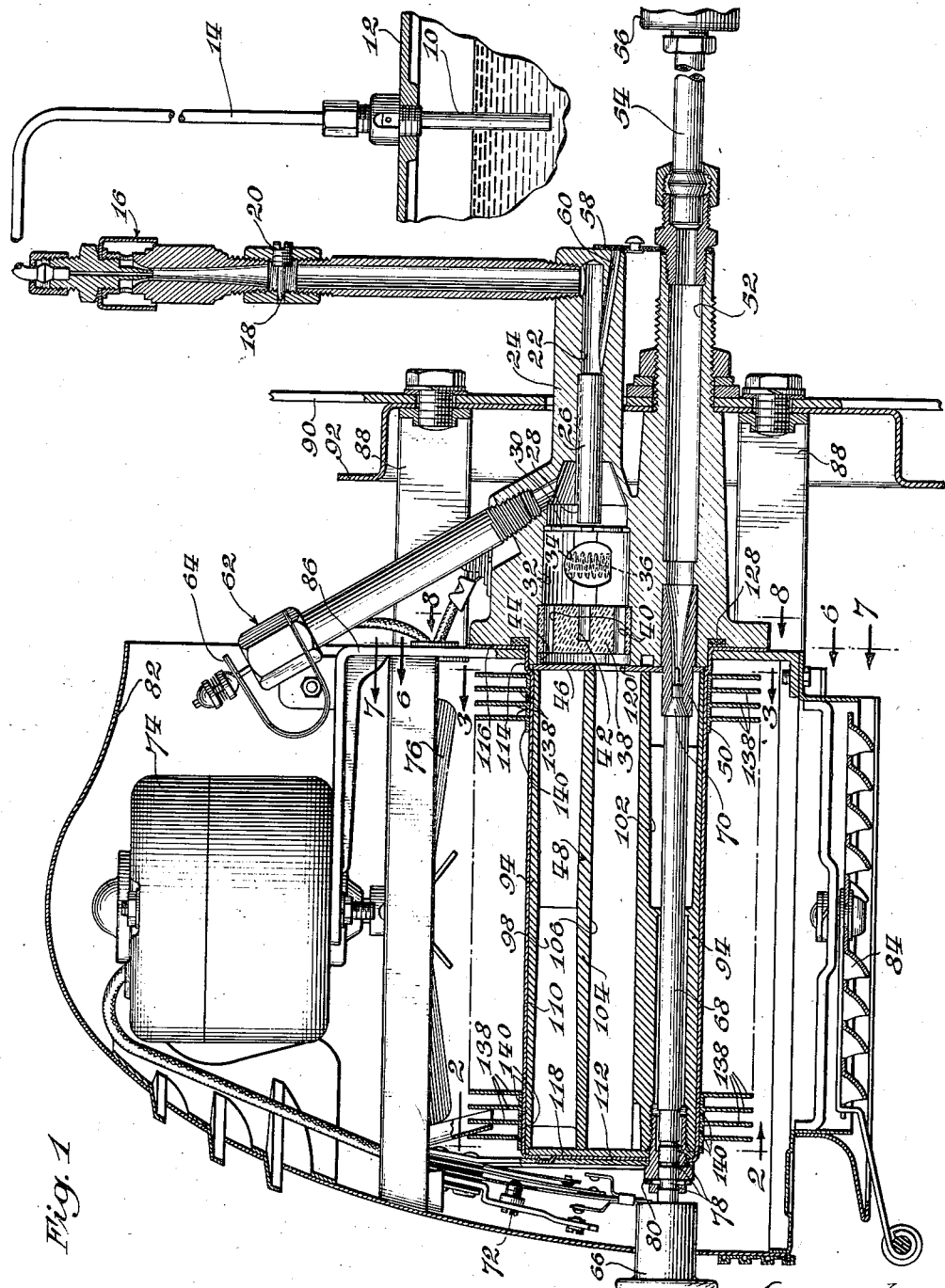

Figs. 6 and 7 are transverse sectional views taken on the lines 6—6 and 7—7, respectively, of Fig. 1;

Fig. 8 is a transverse sectional view of the combustion chamber casing and re-igniter taken on the line 8—8 of Fig. 1; and Fig. 9 is a perspective view of the inlet baffle plate.

The heater to which the present invention appertains is of the type in which the reduced pressure or vacuum in the intake manifold of the automobile engine is utilized to draw a supply of liquid fuel from a suitable source, mix the fuel with air in a suitable carbureting device, and discharge the combustible mixture into a combustion chamber. In the combustion chamber, the mixture is ignited by suitable means, preferably an electrically operated igniter, and from the combustion chamber the hot gases of combustion are drawn through a radiator and from the radiator flow through a vacuum compensating nozzle into the intake manifold of the engine.

As more fully disclosed in my copending applications, Serial No. 61,213, filed January 28, 1936, and Serial No. 120,523, filed January 14, 1937, suitable means are provided to control the supply of current to the igniter so as to conserve the electrical energy which is normally drawn from the storage battery of the vehicle and to connect to the battery a motor for driving a fan used to circulate air from the passenger compartment of the vehicle past the radiator.

In Fig. 1, I have shown the most important operating elements of the heater, these comprising a priming well 10 partially immersed in a liquid fuel, such as gasoline, contained in a suitable reservoir 12 which may be the float bowl of the usual engine carburetor or may be a separate tank or auxiliary reservoir for the fuel. The fuel is drawn from the well 10 through a conduit 14 to the fuel inlet of a carbureting device designated generally as 16, and which may be of any suitable construction capable of mixing the liquid fuel and air in combustible proportions. If desired, an auxiliary air inlet 18 controlled by an adjustable needle valve 20 may be provided for refined adjustment of the proportions of the combustible mixture of fuel and air. The combustible mixture is fed into a passageway 22 formed in a combustion chamber casting 24, and from the passageway 22 through a tube 26, the end of which has a notch 28 formed therein so as to direct fuel radially outwardly from the tube. A baffle 30 is provided, this baffle having clearance about portions of its periphery so as to permit passage of the combustible mixture to the combustion chamber bore 32. At the side of this combustion chamber 32 is an opening 34 leading to a small enclosed chamber containing an igniter. As more fully disclosed in my aforesaid applications, this igniter may comprise a coil of nichrome resistance wire 36 which is adapted to be connected to the storage battery of the vehicle, as will hereinafter appear, and thereby heated to incandescence and ignite the combustible mixture as it flows through the combustion chamber 32. The forward end of the combustion chamber is partially closed by a re-igniter plug 38 which is preferably made of a refractory ceramic material. This plug is provided with a plurality of passageways 40 extending therethrough and with a central pocket 42 which serves as a recess in which the combustible mixture may collect and be heated sufficiently to cause it to ignite and thereby re-ignite the main body of the mixture within the chamber whenever the flame in the combustion chamber accidentally becomes extinguished. The igniter plug 38 is held in position in an enlarged portion of the bore 32 of the combustion chamber by a split ring spring 44.

The gases of combustion which flow through the passageways 40 of the re-igniter plug 38 pass through apertures formed in a baffle plate 46 and from thence through a plurality of intercommunicating passageways formed in the radiator body casting 48, as will appear in greater detail hereinafter. The hot gases of combustion leave the radiator casting 48 through a nozzle 50 which serves as a means for compensating for variations in the degree of intake manifold suction. From the nozzle 50 the products of combustion flow through a passageway 52 and a conduit 54 to the intake manifold 56 of the engine upon which the heater is mounted.

A flap valve 58 controls the admission of air from the atmosphere to the passageway 22 through a duct 60, the flap valve 58 being formed of bimetallic thermostatic metal so as to bend away from the inlet end of the duct 60 and admit additional air to the combustible mixture after the heater has been in operation for a sufficient time to cause the valve 58 to become heated. This valve is more fully disclosed and claimed in my copending application, Serial No. 120,524, filed January 14, 1937. A put out valve device 62 controlled by a U-shaped strip 64 of thermostatic bimetal is provided suddenly to admit a relatively large quantity of air to the combustion chamber, thereby to extinguish the flame therein whenever, due to failure of operation of the motor driven fan or other causes, the air above the radiator becomes heated above a predetermined safe temperature. This valve and its functions are more fully disclosed and claimed in my copending application, Serial No. 120,524, filed January 14, 1937.

The operation of the heater is controlled by a control button 66 which is attached to a stem 68, the end of which is frusto-conical in shape to form a valve 70 cooperable with the mouth of the vacuum compensating nozzle 50 to stop the flow of the gases of combustion therethrough. When the control button 66 is pulled outwardly, thereby opening the valve 70, it controls the operation of a suitable switch mechanism 72 by means of which the igniter is connected to the source of current, usually the automobile storage battery. The switch mechanism 72 is provided with a thermostatically operated element to close the circuit to the motor 74 which drives a fan 76, and shortly thereafter, at a slightly higher temperature, to open the circuit which supplies current to the igniter. The stem 68 of the control valve 70 is provided with three grooves 78 adjacent the control knob 66 which are adapted to be engaged by a spring clip 80 yieldably to hold the control knob in one of its positions of adjustment, i. e., "off," (as shown in Fig. 1), "low heat," and "full on."

The heater as a whole is partially surrounded by a suitable casing 82, in the bottom of which is provided a rotatably adjustable louvered deflector 84. The parts of the heater are secured to a back plate 86, which, by means of supports 88, is fastened to the dashboard 90 of the vehicle, a suitable metallic mounting plate 92 being provided to eliminate any possible fire hazard.

The above brief description of the general features of the construction of the heater of my invention is believed to be desirable so that the more detailed and specific constructional features of the radiator and associated parts, which is set forth hereinafter, may more readily be understood. It will be understood that the fuel feeding means, the put out valve mechanism 62, the switch mechanism, the control valve, and the compensator for variations in vacuum, the combustion chamber casting, and features other than the constructional improvements of the radiator and associated parts are more fully disclosed and are claimed in one or more of my copending applications, Serial No. 61,213, filed January 28, 1936, Serial No. 120,523, filed January 14, 1937, Serial No. 170,075, filed November 29, 1937, Serial No. 120,524, filed January 14, 1937, and the joint application of Thomas F. Spackman and myself, Serial No. 120,522, filed January 14, 1937.

As best shown in Figs. 2 to 5, inclusive, the radiator core formed by the integral casting 48 is preferably a die casting of aluminum containing a relatively large percentage of silicon, in the order of five per cent. I have found that this alloy will not be affected by the high temperatures of the gases of combustion, may be readily die cast, and has the desirable property of high heat conductivity. The casting comprises a generally cylindrical wall 94 which is formed integrally with radial walls defining longitudinally extending passageways 95 to 102, inclusive. A central hollow cylindrical wall 104 provides a central passageway 106. The outer cylindrical wall 94 is provided with a longitudinally extending groove 108 to secure a shell 110 which fits over the radiator casting 48 against rotation relative thereto. The shell 110, as best shown in Fig. 1, is generally cylindrical, having one end thereof closed by an apertured wall 112, and having a portion 114 of slightly increased diameter and a flange 116 at its other end. The casting 48 fits snugly within the shell 110 so that these parts will be in good thermal conductive relationship. The shell 110 is preferably made of drawn sheet copper.

The forward ends of the passageways formed in the radiator casting 48 are closed by a metal plate 118, while the rearward ends thereof are in part closed by the baffle plate 46. The latter plate, due to its proximity to the combustion chamber, is preferably made of a heat resistant sheet metal such as a nickel-chromium alloy. As best shown in Fig. 9, the plate 46 is provided with an inlet opening 120, a pair of auxiliary inlet openings 122 and 124, and an opening 126 which is provided to receive the forwardly projecting end of the nozzle 50. The radiator casting 48, the end plate 118, and the baffle plate 46 are assembled in the shell 110 as shown in Fig. 1, and this radiator assembly is secured by means of the flange 116 of the shell which is clamped between the combustion chamber casting 24 and the back plate 86, a suitable gasket 128 being preferably provided to provide a seal against the admission of air. The casting 24 for the combustion chamber is secured to the plate 86 by means of machine screws 130, as shown in Fig. 8. The radiator casting 48 and plates 46 and 118 are of such dimensions that they must be pressed into the shell 110, with the result that all of these parts will be in good heat conducting relationship with each other.

As best shown in Figs. 2 to 5, inclusive, the forward end of the inner hollow cylindrical wall 104 of the radiator casting is notched to provide a port 132 for the flow of the gaseous products of combustion from the central bore 106 of the casting to the generally segmental shaped passageway 95. It will be understood that the gas flows forwardly from the combustion chamber through the inlet opening 120 in the baffle plate and thence in a forward direction through the central bore 106. The gases will flow rearwardly through the passageway 95 which communicates with the passageway 96 at its rearward end through a notch 134 formed in the radial wall which separates the passageways 95 and 96. The remaining successive radial walls separating the passageways are notched alternately at their forward and rearward ends so as to provide a continuous circuitous passageway for the products of combustion from the combustion chamber to the nozzle 50. The gases will thus flow through the passageway in the direction as indicated by the arrows in Figs. 2, 3, and 4.

However, if the gases of combustion are admitted solely to the central passageway 106, I have found that the operation of the heater is slightly irregular due probably to the alternate increased rarefaction and compression of the gases during their course of flow through the circuitous passageway formed in the radiator casting. Apparently the gases, in passing through the passageways of the radiator, do not uniformly transmit their heat to the casting, but instead the cooling action takes place in such manner that the gases are alternately more and less contracted because of localized cooling thereof. Assuming, for example, that the gases near the outlet end of the passageway through the radiator casting are rapidly cooled, such cooling will result in a sudden contraction of these gases with the result that the flow of the gases through the passageway toward the portion of reduced pressure is accelerated. The increased rate of flow of the hot gases toward the part of the passageway where they are being rapidly cooled will, of course, deter the rapid cooling thereof, whereupon the pressure at the point of initial rapid cooling will again rise to its normal operating pressure. Then the rapid cooling effect may again take place and the cycle of cooling gases to contract them, accelerating the flow, retarding the rapid cooling, and slowing up the flow will be repeated. This cycle of operations takes place rather rapidly with the result that the heater is noisy in operation. The variations in the rate of flow of the gases of combustion through the radiator is reflected in the combustion chamber and the uniform steady combustion desired is prevented. In certain cases, this fluctuating pressure effect upon the gases in the combustion chamber may be sufficiently violent to cause extinguishment of the flame.

I have discovered that the above mentioned disadvantages of fluctuating pressure within the passageway through the radiator casting may be avoided and the operation of the heater greatly improved by the provision of the small auxiliary inlet holes 122 and 124 in the baffle plate 46. As best shown in Figs. 2 and 4, these apertures 122, 124 permit the flow of gases of combustion from the combustion chamber directly into the longitudinal passageways 96 and 10. It appears that the admixture of hot gases directly from the combustion chamber, supplied through these apertures 122 and 124, with the main body of the gases of combustion which have been partially cooled by the time they reach the passageways 96 and 100, results in maintaining a more uniform temperature throughout the entire length of the circuitous passageway through the radiator casting, and thus prevents the unduly rapid localized cooling of the gases of combustion. In any event, I have found that by providing the apertures 122 and 124 in the baffle plate 46, the above described disadvantageous deviations from smooth uninterrupted operation of the heater are avoided.

Inasmuch as the shell 110 is in intimate contact with the radiator casting 48, the heat is freely transmitted from the latter to the former. To facilitate radiation and transmission of heat from the shell 110 to the air which is forced downwardly past the radiator by means of a motor driven fan 76, I preferably provide a plurality of fins 138. These fins are preferably made of thin sheet copper and are rectangular in shape, being of varying width so as to extend into close proximity with the side walls of the casing 82. Each of the fins has a central opening surrounded by a flange 140. The flange 140 has a suitable depression 142 formed therein for registry with the groove formed in the shell 110 and which in turn registers with the longitudinal groove 108 formed in the radiator casting 48. In this manner, the fins are prevented from rotating relative to the shell. The openings in the flanges 140 are preferably of such size as to enable the fins to be pressed over the shell 110 so that there will be a relatively tight press fit and the flanges 140 will be in heat transmitting contact with the shell.

While I have shown and described preferred embodiments of my invention, it will be readily understood by those skilled in the art that variations may be made in the constructions disclosed without departing from the basic features of my invention. I therefore do not wish to be limited to the precise construction disclosed, but desire to include within the scope of my invention all such modifications and variations which will readily suggest themselves.

What I claim as new and desire to secure by United States Letters Patent is:

1. In a radiator for automobile heaters of the internal combustion type, the combination of a radiator casting having a plurality of passageways extending longitudinally thereof, a shell of sheet metal having a closed end and fitting snugly over said casting, a plurality of heat transmitting and radiating fins secured to said shell in heat conducting relationship therewith, and means on said casting, said shell, and said fins to hold said parts against relative rotation.

2. In an automobile heater of the internal combustion type, a radiator comprising a cylindrical shell having one end thereof closed, a generally cylindrical radiator fitting snugly within said shell and having a relatively large external surface in heat transmitting contact with the internal surface of said shell, said radiator element having a plurality of passageways extending longitudinally therethrough and having ports connecting the alternate ends of said passageways to form a single continuous conduit through said element, and a baffle plate closing the open end of said shell, said baffle plate having a relatively large opening communicating with one end of the circuitous passageway formed in said radiator and having a second aperture communicating with said circuitous passageway at a point intermediate the ends thereof.

3. In a radiator for automobile heaters of the internal combustion type, the combination of a generally cylindrical radiator casting having a plurality of passageways extending longitudinally thereof and having a longitudinal groove in its external surface, a shell of sheet metal having a closed end and fitting snugly over said casting, said shell having a longitudinal deformation cooperable with said groove, and a plurality of heat transmitting and radiating fins secured to said shell in heat conducting relationship therewith, each of said fins having a flange snugly embracing the external surface of said shell and spacing the fin from its adjacent fin, the flanges of said fins having indentations cooperable with the deformation in said shell.

4. In an automobile heater of the internal combustion type, the combination of a radiator comprising a cylindrical shell having one end thereof closed, a generally cylindrical radiator fitting snugly within said shell and having a relatively large external surface in heat transmitting contact with the internal surface of said shell, said radiator element having a plurality of passageways extending longitudinally therethrough and having ports connecting the alternate ends of said passageways to form a single continuous conduit through said element, and an apertured baffle plate closing the open end of said shell.

5. A radiator comprising a casting having a circuitous passageway extending therethrough, said circuitous passageway being formed by a plurality of inter-connected passageways extending completely through the casting in generally parallel directions, and metal plates covering the ends of said passageways at least one of said plates being apertured to provide for the admission of hot gases of combustion to said circuitous passageway and the egress of said gases of combustion from said circuitous passageway.

6. A radiator comprising a casting having a circuitous passageway extending therethrough, said circuitous passageway being formed by passageways extending through said casting and ports interconnecting said passageways in series, a sheet metal cup enclosing said casting, and a baffle plate closing the ends of said passageways remote from the bottom of said cup, said baffle plate being provided with apertures for the admission of hot gases of combustion to said circuitous passageway and for the discharge of said gases of combustion therefrom.

7. A radiator comprising an aluminum alloy die casting having a circuitous passageway extending therethrough for the flow of hot gases, a shell of sheet copper fitting snugly about said casting, and a plurality of fins of sheet copper pressed over said shell.

8. A radiator for automobile heaters of the internal combustion type comprising an aluminum alloy die casting having a circuitous passageway formed therein for the flow of the hot gases of combustion, a pair of plates at the ends of said casting, and a cup-shaped copper shell enclosing all except one end of said casting and fitting snugly against the external surface of said casting.

HENRY J. DE N. McCOLLUM.